US006361222B1

(12) United States Patent
Kawaguchi et al.

(10) Patent No.: US 6,361,222 B1
(45) Date of Patent: Mar. 26, 2002

(54) OPTICAL DEVICE AND OPTICAL MODULE PROVIDED WITH OPTICAL DEVICE

(75) Inventors: Shigeru Kawaguchi; Yutaka Natume; Michiya Masuda, all of Yokohama (JP)

(73) Assignees: NHK Spring Co., Ltd., Yokohama (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/598,037

(22) Filed: Jun. 21, 2000

Related U.S. Application Data

(63) Continuation of application No. PCT/JP99/05911, filed on Oct. 26, 1999.

(30) Foreign Application Priority Data

Oct. 26, 1998 (JP) .......................................... 10-304253

(51) Int. Cl.[7] .................................................. G02B 6/36
(52) U.S. Cl. ............................ 385/88; 385/39; 385/49; 385/52
(58) Field of Search .............................. 385/88, 49, 52, 385/39

(56) References Cited

U.S. PATENT DOCUMENTS 4,900,118 A * 2/1990 Yanagawa et al. ....... 350/96.15
5,297,228 A * 3/1994 Yanagawa et al. .......... 385/129

FOREIGN PATENT DOCUMENTS

| JP | 3-179306 | 8/1991 |
|---|---|---|
| JP | 4-52606 | 2/1992 |
| JP | 08-190026 | 7/1996 |
| JP | 8-240738 | 9/1996 |
| JP | 10-160959 | 6/1998 |
| JP | 11-133267 | 5/1999 |
| JP | 11-167043 | 6/1999 |

* cited by examiner

*Primary Examiner*—Hemang Sanghavi
*Assistant Examiner*—Sung Pak
(74) *Attorney, Agent, or Firm*—Frishauf, Holtz, Goodman, Langer & Chick, P.C.

(57) ABSTRACT

An optical device comprises a substrate, an optical waveguide, a laser diode, photodiodes, and a filter. The substrate is provided with a flat reference surface and a V-groove recessed from the reference surface. A pin is fitted in the V-groove of the device and a V-groove of a connector. The optical waveguide is formed on the reference surface. The optical waveguide is provided with a core and a cladding. The core extends along the reference surface. The laser diode emits a signal light beam with a first wavelength toward the core and the photodiode, individually. The filter transmits the signal light beam with the first wavelength and reflects a signal light beam with a second wavelength. The signal light beam reflected by the filter is received by a photodiode.

5 Claims, 4 Drawing Sheets

OPTICAL DEVICE AND OPTICAL MODULE PROVIDED WITH OPTICAL DEVICE

CROSS-REFERENCE TO RELATED APPLICATIONS

This is a continuation of application No. PCT/JP99/05911, filed Oct. 26, 1999.

This application is based upon and claims the benefit of priority from the prior Japanese Patent Application No. 10-304253, filed Oct. 26, 1998, the entire contents of which are incorporated herein by reference.

BACKGROUND OF THE INVENTION

The present invention relates to an optical device, used for, e.g., optical communication or the like, and an optical module provided with the optical device.

Conventionally, an optical device 41 that uses an optical fiber 43 shown in FIG. 5 or the like, an optical device 51 (shown in FIG. 6) described in Jpn. Pat. Appln. KOKAI Publication No. 8-190026, etc. are known as optical transmission-reception devices that are applicable to optical communication, for example.

The optical device 41 shown in FIG. 5 comprises a substrate 42, optical fiber 43, laser diode 44, photodiode 45, filter 46, etc.

The substrate 42, which is formed of a silicon single crystal, is provided with a V-groove 47. The optical fiber 43 is located in the V-groove 47. The laser diode 44 emits signal light beams toward an end face of the optical fiber 43. The photodiode 45 is located over the optical fiber 43. The filter 46 is located dividing the optical fiber 43. The filter 46 guides signal light beams with wavelengths different from the wavelengths of signal light beams that are emitted from the laser diode 44 to the photodiode 45, among other signal light beams transmitted in the optical fiber 43.

The optical fiber 43 of the optical device 41 is connected optically to an optical fiber of an external device such as a connector used for optical communication. In other words, the optical device 41 and the external device are connected optically to each other by means of the optical fibers. Thus, the optical device 41 and the external device can be connected relatively easily, and a loss attributable to the connection is relatively small. In attaching the optical fiber 43 to the substrate 42, moreover, the optical fiber 43 can be positioned with relatively high accuracy with respect to the substrate 42 in a manner such that the optical fiber 43 is fitted in the V-groove 47. Accordingly, the optical fiber 43 that is attached to the substrate 42 can be also connected optically to an optical waveguide of the external device with relatively high accuracy.

In manufacturing the optical device 41, the laser diode 44 and the photodiode 45 must be arranged on or soldered to the substrate 42 in a manner such that the optical fiber 43, which is relatively thin and fragile, is attached to the substrate 42. In some cases, the optical fiber 43 may be damaged during this operation. If the optical fiber 43 is damaged, the volume of transmission of signal light per unit time is reduced, so that the yield of the optical device 41 itself lowers. Thus, the optical device 41 is liable to cost higher.

On the other hand, the conventional optical device 51 shown in FIG. 6 is provided with a planar lightwave circuit 52. A laser diode 53 that functions as a light emitting device, a pair of photodiodes 54a and 54b that function as light receiving devices, and a filter 55 are arranged in predetermined positions on the planar lightwave circuit 52.

The planar lightwave circuit 52 is formed on a substrate 56 that is formed of a silicon single crystal. The lightwave circuit 52 is provided with a core 57 and a cladding 58 that have different refractive indexes. The core 57 and the cladding 58 consist mainly of $SiO_2$ or the like. The paired photodiodes 54a and 54b are connected optically to the core 57 of the planar lightwave circuit 52.

The core 57 and the cladding 58 are formed by a film forming method, such as flame hydrolysis deposition (FHD), chemical vapor deposition (CVD), or physical vapor deposition (PVD).

In this optical device 51, individual waveguides can be formed collectively on the one substrate 56 by the aforesaid film forming method or fine processing technique such as photolithography. Thus, the productivity is high.

In the case of this optical device 51, however, alignment of the respective optic axes of the core 57 and the optical fiber of the external device requires precise adjustment operation. Since the photodiodes 54a and 54b are incorporated in the lightwave circuit 52, moreover, the respective optic axes of the photodiodes 54a and 54b and the core 57 must be accurately aligned with one another. Thus, assembling the optical device 51 requires more labor and time, so that the cost tends to increase. Furthermore, the necessary time and labor for the optical connection of the optical device 51 to the external device also increase.

Accordingly, the object of the present invention is to provide an optical device, which can be produced with improved yield that permits a reduction in cost and can facilitate connection with an external device, and an optical module provided with the optical device.

BRIEF SUMMARY OF THE INVENTION

The optical device of the present invention comprises a substrate having a flat reference surface and a V-groove recessed from the reference surface, and an optical waveguide formed on the reference surface of the substrate and having a core extending along the reference surface.

In the optical device of this invention, the relative positions of the V-groove and the optical waveguide can be accurately maintained by the CVD or other film forming method or fine processing technique such as photolithography. In this optical device, moreover, the core of the optical waveguide is covered by means of a cladding. In attaching or soldering light emitting and receiving devices, which are attendant to the optical waveguide, to the optical waveguide, therefore, the core can be prevented from being damaged. Accordingly, the yield of production of the optical device can be improved, so that the cost can be lowered.

In the optical device of this invention, moreover, the relative positions of the V-groove and the core can be maintained accurately. By fitting, for example, a locating pin of an external device that has an optical fiber into the V-groove, therefore, the respective optic axes of the core and the optical fiber of the external device can be easily connected with high accuracy. Thus, the labor and time required by the connection between the optical device and the external device can be lessened, so that the optical device and the external device can be connected with ease.

In the optical device of this invention, the optical waveguide may be provided with a filter capable of transmitting a signal light beam with a first wavelength transmitted through the core and reflecting a signal light beam with a second wavelength transmitted through the optical waveguide. Preferably, moreover, the substrate is formed of a silicon single crystal and has the V-groove formed by anisotropic etching. According to this invention, the relative positions of the V-groove and the optical waveguide can be maintained more accurately.

The optical device of this invention may be constructed so that it further comprises a light receiving device located on the optical waveguide and a light emitting device for delivering the signal light beam with the first wavelength to the core of the optical waveguide, and that the filter is located on the optical waveguide so as to divide the core of the optical waveguide between first and second portions, and the filter reflects the signal light beam with the second wavelength toward the light receiving device.

In this case, the light receiving device is located beside the optical fiber, so that a photodiode of the plane reception type can be used as this light receiving device. The photodiode of the plane reception type entails relatively low cost, and besides, has a relatively wide light receiving surface, so that it can ease the positioning accuracy that is required when the optical device is provided with the photodiode. These circumstances are advantageous to reduction in cost.

An optical module of this invention comprises a first optical device and a second optical device. The first optical device includes a substrate having a flat first reference surface and a first V-groove recessed from the reference surface and an optical waveguide formed on the first reference surface and having a core extending along the first reference surface. The second optical device includes an optical fiber and a covering portion having a second reference surface extending along the optical fiber and a second V-groove recessed from the reference surface and covering the optical fiber. Further, this optical module is provided with a columnar pin fitted in the first and second V-grooves. The optic axis of the core of the optical waveguide of the first optical device and the optic axis of the optical fiber of the second device are caused to correspond to each other in a manner such that the pin is fitted in the first and second V-grooves.

In the optical module of this invention, the columnar pin is fitted in the first and second V-grooves, whereby the optic axis of the first optical device and the optic axis of the second optical device are substantially aligned with each other. Accordingly, the necessary time and labor for the optical connection between the first and second optical devices are reduced. Thus, connecting operation for the first optical device and an external device, which are optically connected by means of the second optical device, can be carried out quickly and easily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will now be described with reference to FIGS. 1 to 4B.

Figure 1:
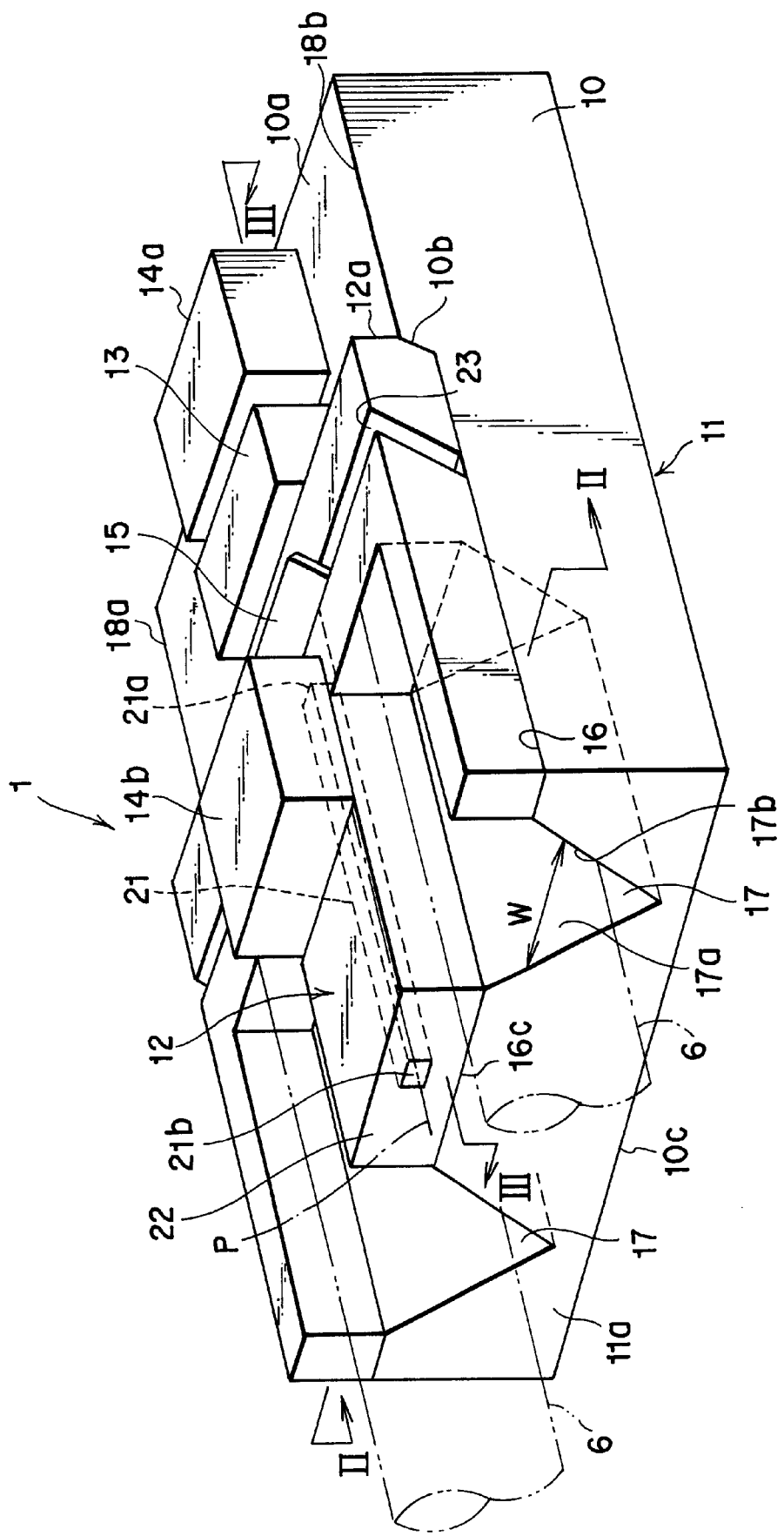
FIG. 1 is a perspective view showing an optical transmission-reception device according to one embodiment of the present invention.
Figure 2:
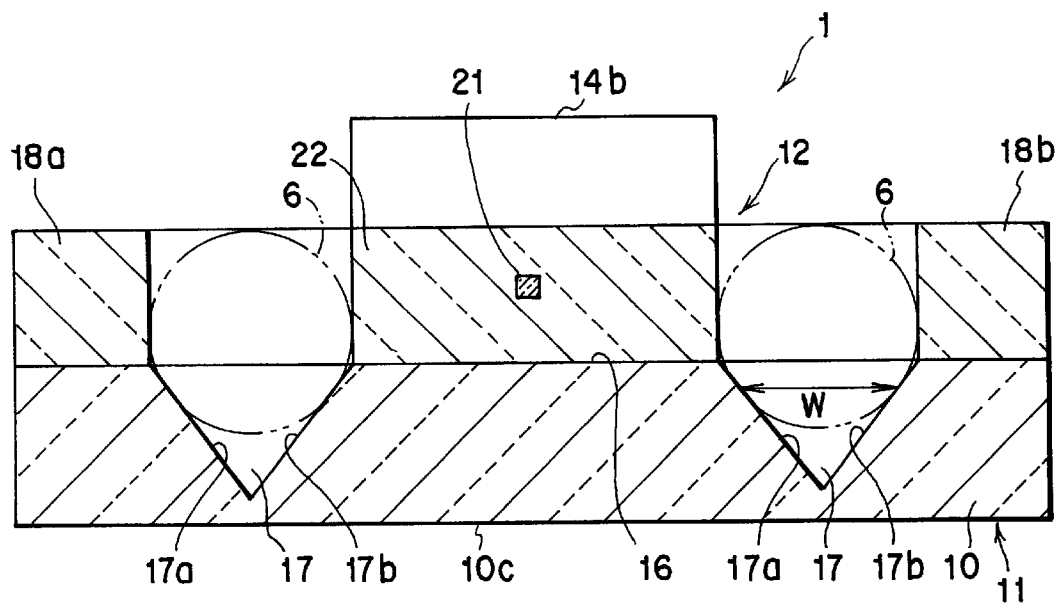
FIG. 2 is a sectional view of the device taken along line II—II of FIG. 1.

FIG. 1 shows an optical transmission-reception device 1 as a first optical device. This optical device 1 has a function to convert signal light beams transmitted through an optical fiber 3 of a connector 2 (shown in FIG. 4A) for use as an external device into electrical signals. The device 1 also has a function to convert electrical signals transmitted from an external device used in a telephone line or the like into signal light beams and transmit them to the outside through the optical fiber 3. The connector 2 is a second optical device according to this invention.

Figures 4A, 4B:
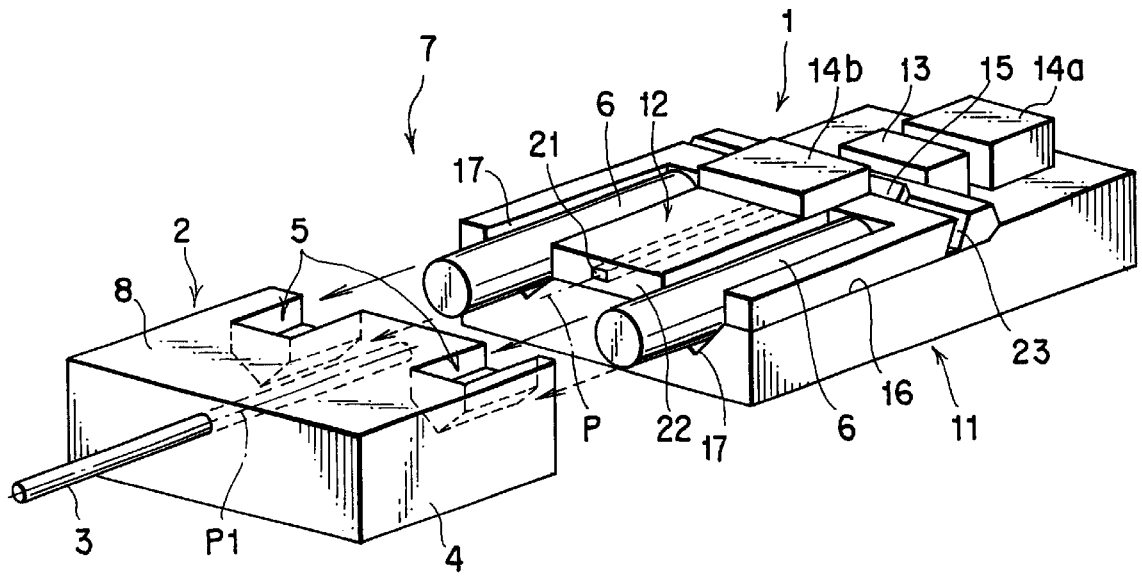
FIG. 4A is an exploded perspective view of the optical transmission-reception device shown in FIG. 1 and an optical module having a connector to be connected to the device.
FIG. 4B is a perspective view of the optical module showing a state in which the optical transmission-reception device and the connector shown in FIG. 4A are connected to each other.
Figure 5:
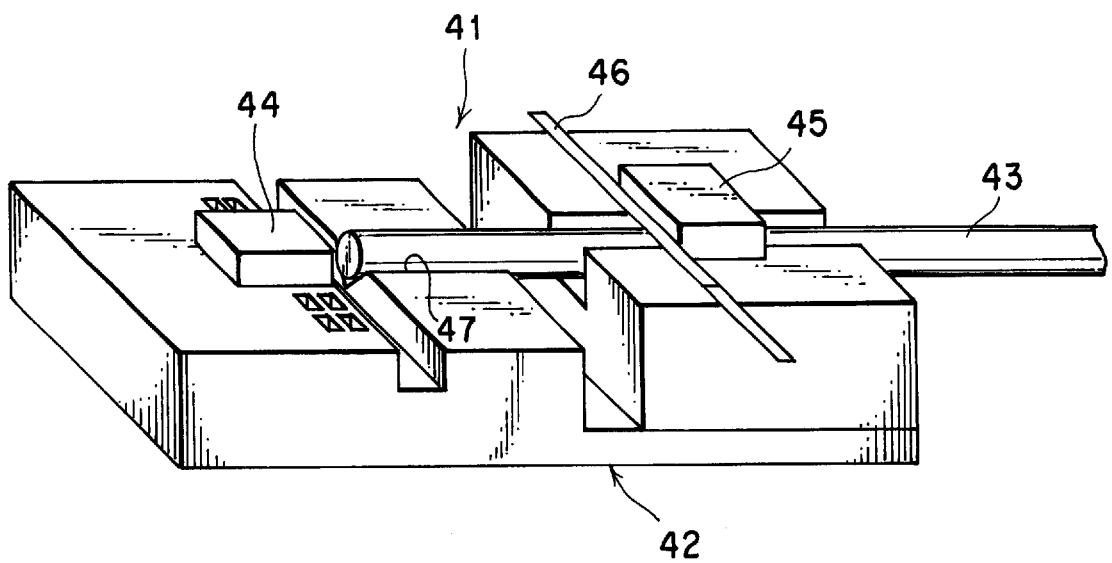
FIG. 5 is a perspective view showing a conventional optical device.
Figure 6:
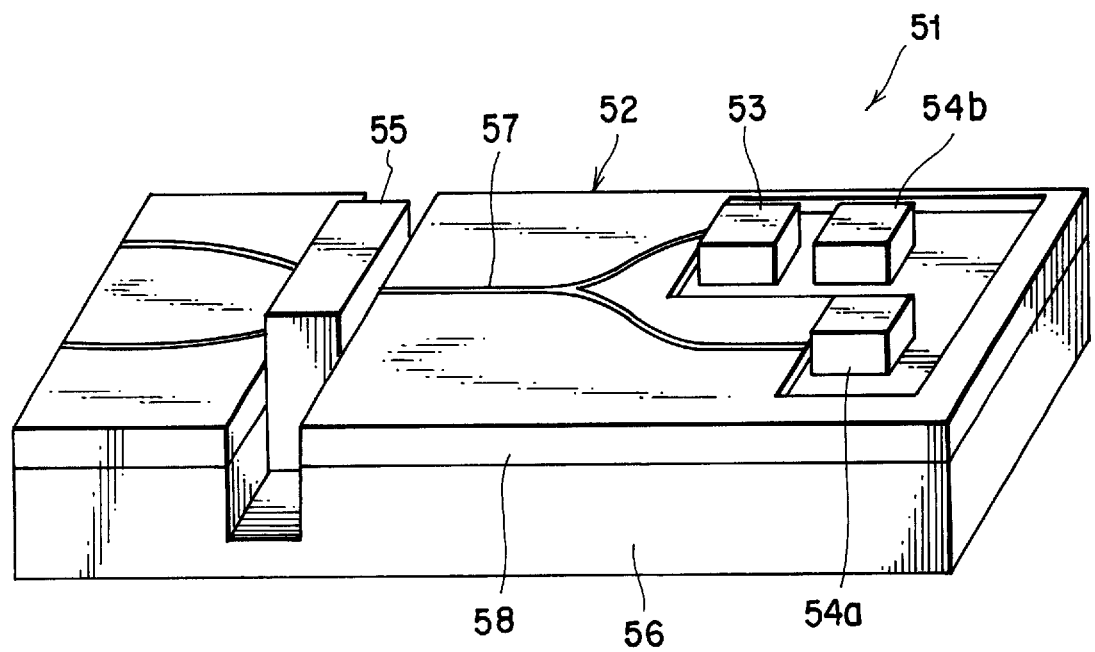
FIG. 6 is a perspective view showing another conventional optical device.

In general, a signal light beam modulated in optical communication is transmitted to the optical transmission-reception device 1 through the optical fiber 3 of the connector 2 shown in FIG. 4B, for example. In order to convert the signal light beam into an aural or video signal with a minimized loss, the signal light beam is temporarily converted into an electrical signal in the device 1. The optical transmission-reception device 1 has a function to convert the signal light beam transmitted through the optical fiber 3 into the electrical signal.

The optical transmission-reception device 1 comprises a substrate 11 formed of a substrate material 10, such as silica glass or a silicon single crystal, an optical waveguide 12, a laser diode 13 for use as an light emitting device, a pair of photodiodes 14a and 14b, and a filter 15.

The substrate 11 is formed having a reference surface 16 and a pair of V-grooves 17 having a V-shaped cross section. The reference surface 16 is situated a tier lower than a flat surface 10a of the substrate material 10 with a step 10b between them. The reference surface 16 is formed flat along the surface 10a of the substrate material 10.

In the case where the substrate material 10 is a silicon single crystal, the reference surface 16 is formed by anisotropic etching, grinding, or the like so that the surface 10a of the substrate material 10 has the step 10b. In the case where the substrate material 10 is silica glass, the reference surface 16 is formed by grinding or the like.

The paired V-grooves 17 are arranged parallel to and at a distance from each other. These V-grooves 17 are recessed individually from the reference surface 16 and have opposite slopes 17a and 17b each. Each v-groove 17 is formed having a V-shaped cross section such that a distance W between the slopes 17a and 17b gradually narrows towards the back face of the substrate material 10. Each V-groove 17 opens in one end face 11a of the substrate 11. Each V-groove 17 extends from the end face 11a to an intermediate portion of the substrate 11.

In the case where the substrate material 10 is a silicon single crystal, the V-grooves 17 are formed by anisotropic etching, grinding, or the like. In the case where the substrate material 10 is silica glass, the V-grooves 17 are formed by grinding or the like. Columnar locating pins 6 shown in FIG. 4A are fitted in the paired V-grooves 17, individually.

The optical waveguide 12 is formed on the reference surface 16 of the substrate 11. The optical waveguide 12 comprises a high-refraction core 21 and a low-refraction cladding 22 that covers the core 21. The core 21 is formed so that its optic axis P extends along the reference surface 16 and the paired V-grooves 17. The core 21 is formed extending from one end 16c of the reference surface 16 to the other end 16d (shown in FIG. 3).

The core 21 is situated in a position such that it is connected optically to the optical fiber 3 when the pins 6 are fitted in locating V-grooves 5 of the connector 2 (mentioned later) and the V-grooves 17 of the optical waveguide 12. The cladding 22 is formed on the reference surface 16. The cladding 22 covers the whole outer periphery of the core 21 except two opposite end faces 21a and 21b of the core 21.

Figure 3:
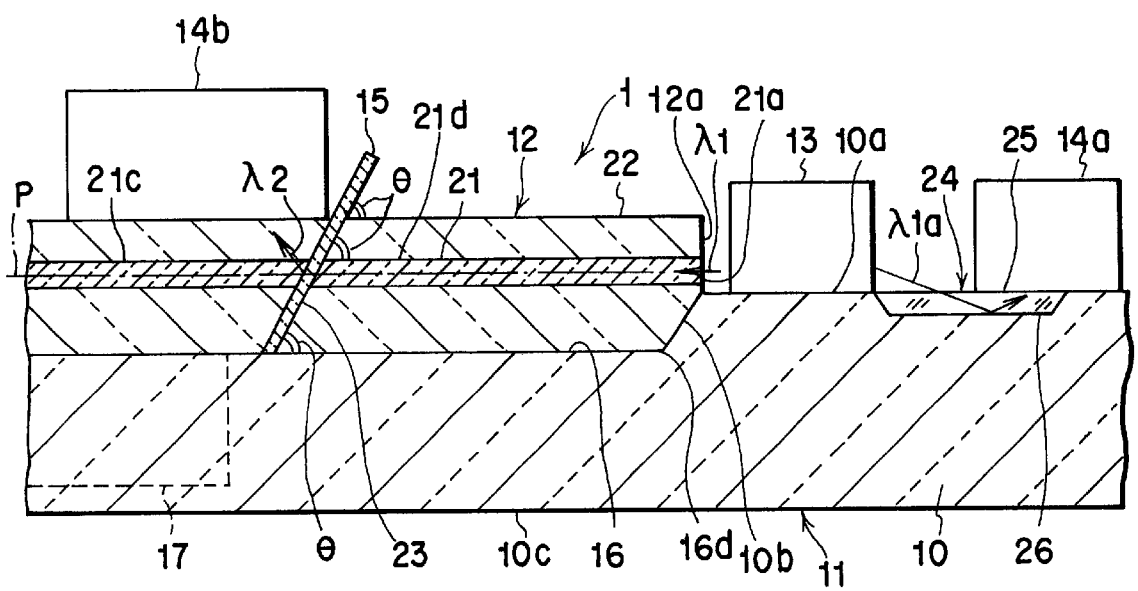
FIG. 3 is a sectional view of the device taken along line III—III of FIG. 1.

The optical waveguide 12 is formed having a slit 23 in which the filter 15 is to be inserted. The slit 23 extends in the crosswise direction of an end face 12a of the optical waveguide 12, and ranges between two opposite side portions 18a and 18b of the device 1. As shown in FIG. 3, the slit 23 is inclined at an angle θ to the reference surface 16 and the optic axis P of the core 21, as viewed from beside the optical transmission-reception device 1. The filter 15 that is inserted in the slit 23 divides the core 21 of the optical waveguide 12 between a first portion 21c and a second portion 21d. The slit 23 is formed by means of a dicing machine or by etching.

The laser diode 13 is located on the surface 10a of the substrate material 10. The laser diode 13 emits a signal light beam with one wavelength, out of two types of signal light beams with wavelengths of 1.3 μm and 1.55 μm that are mainly used in optical communication, toward the end face 21b of the core 21.

As the laser diode 13 emits the signal light beam with one wavelength toward the end face 21a of the core 21, it also emits the signal light beam with the aforesaid wavelength toward the one photodiode 14a. The laser diode 13 of this embodiment emits the signal light beam with the wavelength of 1.3 μm.

The laser diode 13, which is connected electrically to an external device, converts an electrical signal delivered from the external device to the laser diode 13 into a signal light beam with the wavelength of 1.3 μm for example, and emits this signal light beam toward the end face 21a of the core 21 of the optical waveguide 12.

The one photodiode 14a, out of the photodiodes 14a and 14b, is intended for monitoring. The monitoring photodiode 14a is located on the surface 10a of the substrate material 10. The monitoring photodiode 14a receives a signal light beam λ1a that is emitted from the laser diode 13, as mentioned before. The monitoring photodiode 14a, which is connected electrically to an external device, receives the signal light beam emitted from the laser diode 13, and delivers an electrical signal corresponding to the signal light beam to the external device.

The other photodiode 14b is intended for reception. This reception photodiode 14b is provided on the surface of the optical waveguide 12. The reception photodiode 14b receives a signal light beam λ2 that is delivered from the connector 2 to the core 21 and reflected by the filter 15. The reception photodiode 14b is connected electrically to aforesaid external device. The photodiode 14b receives the signal light beam λ2 that is reflected by the filter 15, converts it into a electrical signal, and delivers it to the aforesaid external device. The reception photodiode 14b is a light receiving device according to this invention.

In the case of this embodiment, the photodiodes 14a and 14b are used of the plane reception type, entailing relatively low cost and having a relatively wide light receiving surface. Conductive films (not shown) for electrically connecting the laser diode 13 and the photodiodes 14a and 14b to the aforesaid external device are formed on the surface 10a of the substrate material 10 and the surface of the optical waveguide 12. These conductive films are formed of gold (Au) or aluminum (Al). The laser diode 13 and photodiodes 14a and 14b and the aforesaid conductive films are connected electrically to one another by soldering or the like.

The filter 15 is in the form of a plate. The filter 15 transmits the signal light beam with one wavelength emitted from the laser diode 13, out of the two types of signal light beams with the wavelengths of 1.3 μm and 1.55 μm that are mainly used in optical communication, and reflects the signal light beam with the other wavelength. Since the laser diode 13 of this embodiment emits the signal light beam with the wavelength of 1.3 μm, the filter 15 transmits the signal light beam with the wavelength of 1.3 μm and reflects the signal light beam with the wavelength of 1.55 μm.

The filter 15 is inserted in the slit 23 in a manner such that it divides the core 21 of the optical waveguide 12 between the first and second portions 21c and 21d. As shown in FIG. 3, the filter 15 is inclined at the angle θ to the reference surface 16, as viewed from beside the optical transmission-reception device 1. Moreover, the filter 15 extends at right angles to the optic axis P of the core 21, as viewed from above the optical transmission-reception device 1. After the filter 15 is inserted into the slit 23, it is fixed to the substrate 11 by means of a UV (ultraviolet) curing agent that cures when it is irradiated with ultraviolet rays.

The filter 15 reflects the signal light beam with the other wavelength, different from the one wavelength of the beam emitted from the laser diode 13, out of the signal light beams delivered from the optical fiber 3 of the connector 2 (shown in FIG. 4A) to the core 21, and guides it to the reception photodiode 14b. For example, the filter 15 of this embodiment reflects the signal light beam with the wavelength of 1.55 μm and guides it to the reception photodiode 14b.

As shown in FIG. 3, the optical transmission reception device 1 is provided with a light guide portion 24 for guiding the signal light beam emitted from the laser diode 13 to the monitoring photodiode 14a. The light guide portion 24 is provided with a recessed portion 25, which is recessed from the surface 10a of the substrate material 10, and a reflective film 26 formed on the inner surface of the recessed portion 25.

The recessed portion 25 is formed below the laser diode 13 and the monitoring photodiode 14a. The reflective film 26 is formed by depositing gold, chromium, or other metal on the inner surface of the recessed portion 25. The surface of the reflective film 26 is specular.

The following is a description of an example of manufacturing processes for the optical transmission-reception device 1 of the aforementioned construction.

First, the reference surface 16, which is situated a tier lower than the surface 10a of the substrate material 10 with the step 10b between them, is formed on the substrate material 10 of a silicon single crystal or silica glass by etching or grinding.

A low-refraction lower cladding of $SiO_2$ or the like is formed on the reference surface 16 by a film forming method, such as the CVD method, PVD method, or FHD method. The lower cladding is situated between the reference surface 16 and the core 21 that is formed in a process mentioned later. The lower cladding is etched or ground, whereby the surface of the lower cladding is flattened along the reference surface 16.

The core 21, which consists mainly of $SiO_2$, is formed on the lower cladding by the aforesaid CVD or other film forming method. In forming the core 21, a dopant, such as germanium (Ge) or titanium (Ti), is added to $SiO_2$ so that the refractive index of the core 21 is about 0.2 to 0.3% higher than that of the lower cladding. The refractive index of the lower cladding may be made lower than that of the core 21 by adding a dopant for lowering the refractive index to $SiO_2$ that forms the lower cladding instead of increasing the refractive index of the core 21.

After a given waveguide pattern of a photoresist is formed on the surface of the core 21, it is etched by RIE (reactive ion etching), whereupon the core 21 with the given pattern is formed.

After the core 21 is formed, the V-grooves 17 are formed by anisotropic etching or grinding. In the case where the substrate material 10 is formed of a silicon single crystal, the V-grooves 17 can be formed by anisotropic etching, so that one and the same photomask can be used in forming the core 21 and the V-grooves 17. Thus, relative dislocation between the core 21 and the V-grooves 17 can be reduced substantially to zero.

Then, a low-refraction upper cladding of $SiO_2$ or the like is formed covering the core 21 by a film forming method, such as the CVD method, PVD method, or FHD method. This upper cladding and the aforesaid lower cladding constitute the cladding 22 of the optical waveguide 12. After the cladding 22 is formed, waste portions of the cladding 22 are removed, whereupon the surface 10a of the substrate material 10 is exposed.

The conductive films that conduct to the photodiodes 14a and 14b are formed on the surface 10a of the substrate material 10 and optical waveguide 12. The slit 23 is formed by means of the dicing machine or by etching. The laser diode 13 and the photodiodes 14a and 14b are mounted individually in predetermined positions and connected electrically to the conductive films by soldering. The filter 15 is inserted into the slit 23, and the filter 15 is fixed to the optical waveguide 12 with a UV adhesive agent.

An optical module 7 is formed as the optical transmission-reception device 1, which serves as the first optical device, and the connector 2, which serves as the second optical device, are connected to each other, as shown in FIG. 4B. The optical module 7 includes the optical transmission-reception device 1, connector 2, locating pins 6, etc.

As shown in FIG. 4A, the connector 2 is provided with the optical fiber 3 and a covering portion 4 that protects the optical fiber 3. The covering portion 4 is provided with a flat reference surface 8, which extends along an optic axis P1 of the optical fiber 3, and a pair of V-grooves 5 that are recessed from the reference surface 8. The paired V-grooves 5 are formed parallel to each other. The paired pins 6 are fitted individually in the V-grooves 17 of the device 1 and the V-grooves 5 of the connector 2 corresponding thereto.

The optical fiber 3 of the connector 2 is situated in a position such that it can be connected optically to the core 21 when the paired pins 6 are fitted in the first and second V-grooves 17 and 5, individually. In this arrangement, the deviation between the optic axis P1 of the optical fiber 3 and the optic axis P of the core 21 is adjusted to, e.g., 0.5 $\mu$m or less, that is, the two optic axes P and P1 are substantially in alignment.

When the signal light beam with the wavelength of 1.55 $\mu$m is delivered from the optical fiber 3 of the connector 2 for use as the external device to the core 21, this signal light beam is reflected by the filter 15. As shown in FIG. 3, the reflected signal light beam $\lambda2$ is received by the reception photodiode 14b. The reception photodiode 14b converts this signal light beam into an electrical signal and delivers it to the external device.

A signal light beam $\lambda1$ with the wavelength of 1.3 $\mu$m emitted from the laser diode 13 lands on the end face 21a of the core 21, passes through the filter 15, and then lands on the optical fiber 3 of the connector 2. The signal light beam incident upon the optical fiber 3 is guided to the outside of the optical transmission-reception device 1 through the optical fiber 3. The signal light beam $\lambda1a$ that is emitted from the laser diode 13 and directed to the monitoring photodiode 14a is reflected by the reflective film 26 of the light guide portion 24 and received by the monitoring photodiode 14a.

In the optical transmission-reception device 1 of this embodiment, the optical waveguide 12 that has the V-grooves 17 and the core 21 is formed on the reference surface 16 of the substrate 11, so that the relative positions of the V-grooves 17 and the optical waveguide 12 can be accurately maintained by the CVD or other film forming method or fine processing technique such as photolithography. Further, the device 1 uses the optical waveguide 12 in place of an optical fiber for transmitting signal light beams. The core 21 of the optical waveguide 12 is covered by means of the cladding 22. In attaching or soldering the laser diode 13 and the photodiodes 14a and 14b to the optical waveguide 12, therefore, there is no possibility of the core 21 being damaged. Accordingly, reduction of the volume of transmission of signal light beam can be avoided. For these reasons, the yield of production of the device 1 can be improved, so that the cost can be lowered.

In this device 1, moreover, the V-grooves 17 are recessed from the reference surface 16 of the substrate 11, and the core 21 of the optical waveguide 12 extends along the reference surface 16, so that the relative positions of the V-grooves 17 and the core 21 can be maintained accurately. Thus, the optic axis P of the core 21 and the optic axis P1 of the connector 2 can be easily connected with high accuracy by fitting the locating pins 6 into the V-grooves 17 of the device 1 and the V-grooves 5 of the connector 2. In consequence, the labor and time required by the connection between the device 1 and the connector 2 or other external device are lessened, so that the device 1 and the external device can be connected with ease.

In the case where the substrate material 10 is formed of a silicon single crystal and the V-grooves 17 are formed by anisotropic etching, furthermore, the relative positions of the V-grooves 17 and the core 21 can be maintained more accurately. In this case, the optic axis P of the core 21 and the optic axis P1 of the connector 2 can be aligned with higher accuracy as the device 21 and the connector 2 are connected to each other.

In this device 1, the signal light beam $\lambda2$ that is reflected by the filter 15 is guided directly to the reception photodiode 14b, so that the loss of the signal light beam 2 is restrained.

Accordingly, the light receiving efficiency for the signal light beam λ2 is improved.

This device 1 uses the photodiodes 14a and 14b of the plane reception type. Accordingly, the cost of the device 1 can be further lowered, and the required positioning accuracy of the photodiodes 14a and 14b for the assembly of the device 1 can be eased. In consequence, the time and labor required by the manufacture of the device 1 are lessened, so that the cost can be additionally lowered.

As is evident from the above description, the optical device of the present invention and the optical module that uses this optical device are suitably applicable to the field of, e.g., optical communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical device comprising:
    a substrate having a reference surface and a flat surface situated at a different height than the reference surface;
    a V-groove recessed from the reference surface;
    an optical waveguide having a core formed on the reference surface and parallel to the V-groove;
    a recessed portion recessed from the flat surface and located on an extensional optical axis of the core of the optical waveguide; and
    a filter insertion slit formed in a crosswise direction of the core of the optical waveguide.

2. An optical device according to claim 1, wherein the substrate is formed of a silicon single crystal, and the V-groove in the first reference surface and the recessed portion in the flat surface are formed by anisotropic etching.

3. An optical device according to claim 1, wherein the reference surface is formed flat below the flat surface with a step therebetween.

4. An optical device according to claim 1, further comprising:
    a filter inserted in the slit, said filter allowing transmission of a signal light beam of a first wavelength which passes through the core of the optical waveguide and reflecting a signal light beam of a second wavelength;
    a light emitting device, provided on the flat surface, for emitting the signal light beam of the first wavelength; and
    a light receiving device, provided above the core of the optical waveguide, for receiving the signal light beam of the second wavelength reflected by the filter.

5. An optical device according to claim 4, further comprising:
    a second light receiving device located on the recessed portion, said second light-receiving device comprising a photodiode of a plane reception type for receiving the signal light beam of the first wavelength, which the light emitting device emits toward the recessed portion.

* * * * *